(12) United States Patent
Abzarian et al.

(10) Patent No.: US 8,209,501 B2
(45) Date of Patent: Jun. 26, 2012

(54) CAPTURING AND LOADING OPERATING SYSTEM STATES

(75) Inventors: David Abzarian, Kirkland, WA (US); Todd L. Carpenter, Monroe, WA (US); Harish S. Kulkarni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 12/435,737

(22) Filed: May 5, 2009

(65) Prior Publication Data

US 2010/0287344 A1 Nov. 11, 2010

(51) Int. Cl.
*G06F 13/00* (2006.01)
(52) U.S. Cl. ................ 711/154; 711/162; 711/156
(58) Field of Classification Search .......... 711/154, 711/162, 156; 713/2
See application file for complete search history.

(56) References Cited

U.S. PATENT DOCUMENTS

| | | | |
|---|---|---|---|
| 6,209,088 B1 | 3/2001 | Reneris | |
| 7,073,052 B2 | 7/2006 | Brown et al. | |
| 2004/0255179 A1 | 12/2004 | Mayer | |
| 2005/0132346 A1 | 6/2005 | Tsantilis | |
| 2006/0248350 A1* | 11/2006 | Stanev | 713/189 |
| 2007/0112899 A1 | 5/2007 | Edwards et al. | |
| 2007/0124573 A1 | 5/2007 | Walker et al. | |
| 2010/0205421 A1* | 8/2010 | Campbell et al. | 713/2 |

FOREIGN PATENT DOCUMENTS

| | | |
|---|---|---|
| KR | 1020010033687 A | 4/2001 |
| KR | 1020050070635 A | 7/2005 |

OTHER PUBLICATIONS

"International Search Report", Mailed Date: Nov. 16, 2010, Application No. PCT/US2010/031457, Filed Date: Apr. 16, 2010, pp. 8.
Russinovich, et al., "Windows XP: Kernel Improvements Create a More Robust, Powerful, and Scalable OS", Retrieved at << http://msdn.microsoft.com/en-us/site/cc302206 >>, Retrieved Date: Jan. 10, 2011, pp. 8.
"Re: Hibernate multiple user", Retrieved at << http://www.tech-archive.net/Archive/WinXP/microsoft.public.windowsxp.general/2006-06/msg03194.html >>, Retrieved Date: Mar. 6, 2009, pp. 2.
"Hibernate multiple user", Retrieved at << http://www.pcreview.co.uk/forums/thread-2549661.php >>, Retrieved Date: Mar. 6, 2009, pp. 4.

* cited by examiner

*Primary Examiner* — Yu Le
*Assistant Examiner* — Han Yang
(74) *Attorney, Agent, or Firm* — Lyon & Harr, LLP; Richard T. Lyon

(57) ABSTRACT

Operating system states capture and loading technique embodiments are presented that involve the capture and loading of baseline system states. This is accomplished, in one embodiment, by storing the states of a computer's operating system memory that it is desired to restore at a future time. No changes are permitted to the persisted storage associated with the computer. Instead, changes that would have been made to the persisted storage during an ensuing computing session, had they not been prevented, are stored in a separate computing session file. Whenever it is desired to return the operating system to its baseline condition, the stored baseline system memory states are loaded into the operating system memory, in lieu of the operating system memory's current states.

19 Claims, 6 Drawing Sheets

CAPTURING AND LOADING OPERATING SYSTEM STATES

BACKGROUND

Internet cafes and other shared access hosts desire restoration of a baseline system condition to shared computers after every computing session to ensure a consistent and reliable user experience. Typically, this requires that the host system be rebooted after each session to restore the baseline state.

Hibernation allows for the contents of system memory and registers (e.g., device hardware registers states, page file/application and driver states, and so on) to be saved to persistent storage such as a hard disk for the purposes of a quicker restoration of the conditions associated with the last computing session. This feature is primarily used to allow the operating system of a computer to be shutdown, such that on the following startup, the operating system is restored from the hibernation file and resumes from the point where it was shutdown.

This hibernation feature typically utilizes a single file (e.g., hiberfil.sys), which is written to upon initiation of the feature. Subsequently, the hibernation file is used to restore the operating system to its previous condition as part of the boot process.

SUMMARY

This Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

Operating system states capture and loading technique embodiments described herein generally involving at least the capture and loading of baseline system states outside the boot process. This is accomplished, in one embodiment, by first storing the states of a computer's operating system memory that it is desired to restore as the baseline condition at a future time. Once the baseline system memory states are stored, no changes are permitted to the persisted storage associated with the computer. Instead, changes that would have been made to the persisted storage during an ensuing computing session, had they not been prevented, are stored in a separate computing session file. The change data stored in the computing session file, in combination with the data stored in the persisted storage, are employed during a computing session.

Whenever it is desired to return the operating system to its baseline condition, such as at the termination of a computing session, the stored baseline system memory states are loaded into the operating system memory, in lieu of the operating system memory's current states. Since there have been no changes allowed to the persisted storage associated with the computer, the operating system is now restored to its baseline condition.

If the sole purpose of capturing the operating system states is to return the operating system to a baseline system state, then in one embodiment the computing session file is discarded. However, in another embodiment the computing session file can be retained and loaded at a future time to resume the corresponding computing session where it left off.

This latter embodiment generally entails capturing and restoring the baseline conditions as described above at the end of each computing session. However, whenever it is determined a current computing session has been terminated, additional actions also take place. Namely, a session state file representing the state of the operating system memory of the computer existing at the time the computing session was terminated is stored. The captured changes that would have been made to the persisted storage are also stored in a computing session file. To resume a previous computing session, the stored computing session states are loaded. This first entails accessing the stored session state file corresponding to the computing session it is desired to resume in a new session. The accessed session states are then loaded into the computer's operating system memory, in lieu of the operating system memory's current (i.e., baseline) states. In addition, the computing session file corresponding to the computing session it is desired to resume in the new session is accessed. Further, changes that would have been made to the persisted storage during the current computing session are again captured. The captured changes are stored in the computing session file. As before, the captured changes, as well as other data from the persisted storage, are used during the current computing session.

DESCRIPTION OF THE DRAWINGS

The specific features, aspects, and advantages of the disclosure will become better understood with regard to the following description, appended claims, and accompanying drawings where:

DETAILED DESCRIPTION

In the following description of operating system states capture and loading technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Operating System State Management Architecture

Before the operating system states capture and loading technique embodiments are described, a general description of a suitable operating system state management architecture in which portions thereof may be implemented will be described. In general, the technique embodiments are operational with numerous general purpose or special purpose computing system environments or configurations, which will be described in greater detail in a later section of this description.

Figure 1:
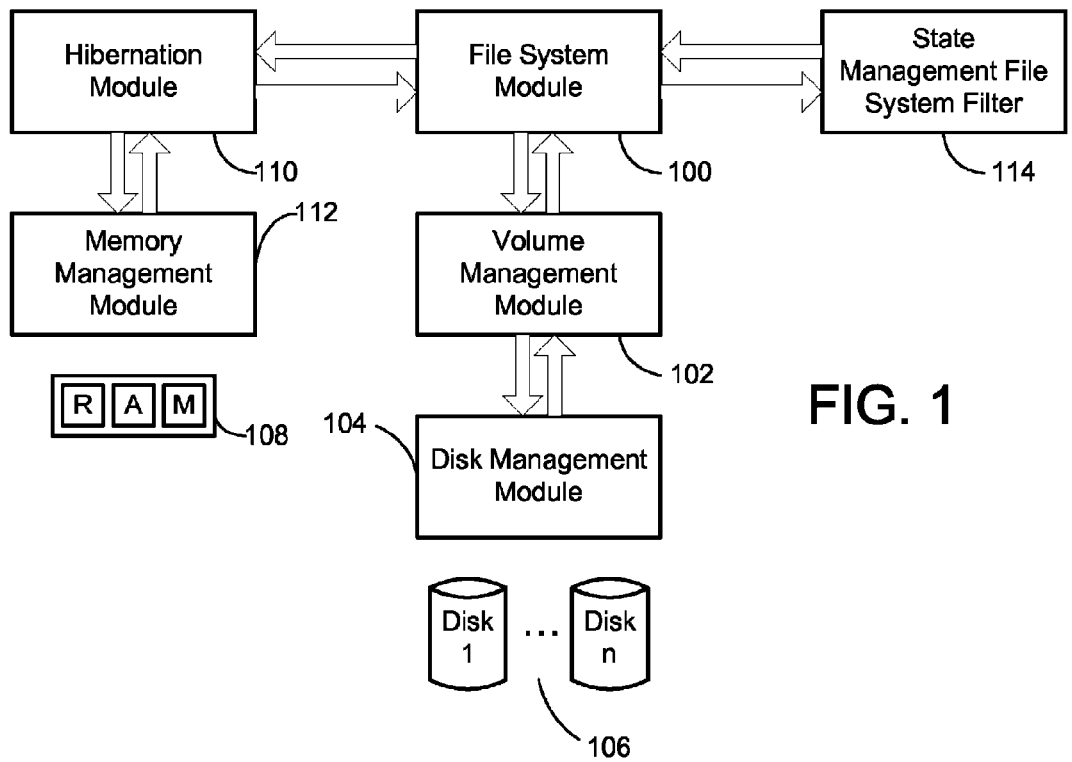
FIG. 1 is a simplified diagram of an operating system state management architecture in which portions of the operating system states capture and loading technique embodiments described herein may be implemented.

These general purpose or special purpose computers employ an operating system. One of the purposes of the operating system is to manage both the operating system memory and the persisted storage associated with the computer. The heart of this management scheme is a file system module 100, as shown in FIG. 1. The file system module 100 is in communication with and works through a volume management module 102 to control the persisted storage associated with the computer. The persisted storage can be any non-volatile storage device or devices, such as the hard disks 106 shown in FIG. 1. Typically, the persisted storage is managed via a device management module. In the example of FIG. 1, this takes the form of a disk management module 104, which is in communication with the volume management module 102 and ultimately controlled by the file system module 100.

The current operating system states of the computer are stored in an operating system memory, and change as a computing session being conducted on the computer progresses. Typically, the operating system memory takes the form of a volatile storage device. For instance, in the example architecture of FIG. 1, the operating system memory is a Random Access Memory (RAM) 108. The current operating system memory states can be captured in a file called a hibernation image file. This hibernation mechanism allows for the states of the system memory and registers to be saved to the persisted storage for the purpose of a quick restoration. This is primarily used to allow the operating system to be shut down on the computer and then upon restarting the operating system, using the hibernation image file to restore the previous states. Thus, the operating system can resume operations from the point where it was shutdown. In current operating systems, the hibernation image file is created during shutdown based on a user command to do so. The aforementioned state restoration process typically occurs as part of the boot path when the operating system is restarted. In the context of the example architecture of FIG. 1, the file management module 100 is in communication with a hibernation module 110. When instructed to do so, the hibernation module 110 generates the hibernation image file and employs the help of the file system module 100 to store the file in the persisted storage. An operating system memory management module 112 is used to capture the current states of the operating system memory (e.g., the RAM 108 as shown in FIG. 1) and deliver them to the hibernation module 110.

While not part of a conventional operating system management architecture, the operating system states capture and loading technique embodiments described herein employ a state management file system filter 114 to "filter out" and capture changes that would ordinarily be made to the persisted storage. In the exemplary architecture of FIG. 1, the state management file system filter 114 is in communication with the file system 100 and employs its help in storing the captured changes in the persisted storage in a file referred to herein as the computing session file. The operation of the filter 114 and role of the computing session file will be described in more detail in the sections to follow.

It is noted that the foregoing operating system state management architecture is only one example of a suitable architecture and is not intended to suggest any limitation as to the scope of use or functionality of the operating system states capture and loading technique embodiments described herein. Neither should the operating system state management architecture be interpreted as having any dependency or requirement relating to any one or combination of components illustrated in FIG. 1.

2.0 Operating System States Capture and Loading

A typical operating system computing session includes changes to both the aforementioned system memory and persisted storage. In general, the operating system states capture and loading technique embodiments described herein allow for capturing the states of both the persisted storage and system memory at a moment in time, and subsequently loading the captured system states. This is accomplished in one implementation using a hibernation image file to capture the state of system memory. It is noted that even though a hibernation image file is used, this does not mean the operating system must be restored using a reboot procedure as would typical be the case. Rather, as will be described in more detail in the sections to follow, the operating system states capture and loading technique embodiments described herein operate outside the standard hibernation shutdown and boot path restart procedures.

As for capturing changes, the aforementioned state management file system filter is used in one embodiment to capture changes that would ordinarily be made to the persisted storage. Thus, no changes are allowed to the persisted storage. Loading the captured system states puts the operating system back into the condition it was when the system states were captured. This is true, even if the state of the system memory was changed during a computing session. It is also noted that since the persisted storage was prevented from being changed, it is maintained in the condition it was in when the system states were captured.

In one embodiment, the captured system state represents a baseline state, which can be returned to at the termination of a computing session. This allows for a fresh start at the beginning of each computing session with a known baseline condition. Thus, in the case of an Internet cafe or other shared access host computing situation, the baseline system state is restored after every computing session to ensure a consistent and reliable user experience.

In another embodiment, more than one state system is captured. The baseline states are captured as before, but in addition, computing session system states are captured. This allows a user to load the captured computing session system states at a future time and continue where the user left off in the previous computing session. The operating system is still returned to its baseline state after each computing session. Thus, it doesn't matter if the user loads a captured computing session system state for the very next computing session or for a computing session that occurs after one or more intervening sessions have taken place. This also has advantages in the case of an Internet cafe or other shared access host computing situation. Not only is the baseline system state restored after each computing session (which would typically involve multiple users), but an individual user can capture his or her computing session, and then return to the system states associated with that computing session at a future time.

In yet another embodiment, the operating system states capture and loading technique allows for rapid debugging through the use of an incremental loading of session states into a known good baseline condition. For example, in the event of an operating system crash, a crash dump file can be used as the session state file, and incrementally loaded until the problem is found.

The foregoing embodiments, as well as other will be discussed in more detail in the sections to follow.

2.1 Capturing And Loading Baseline System States

Figure 2:
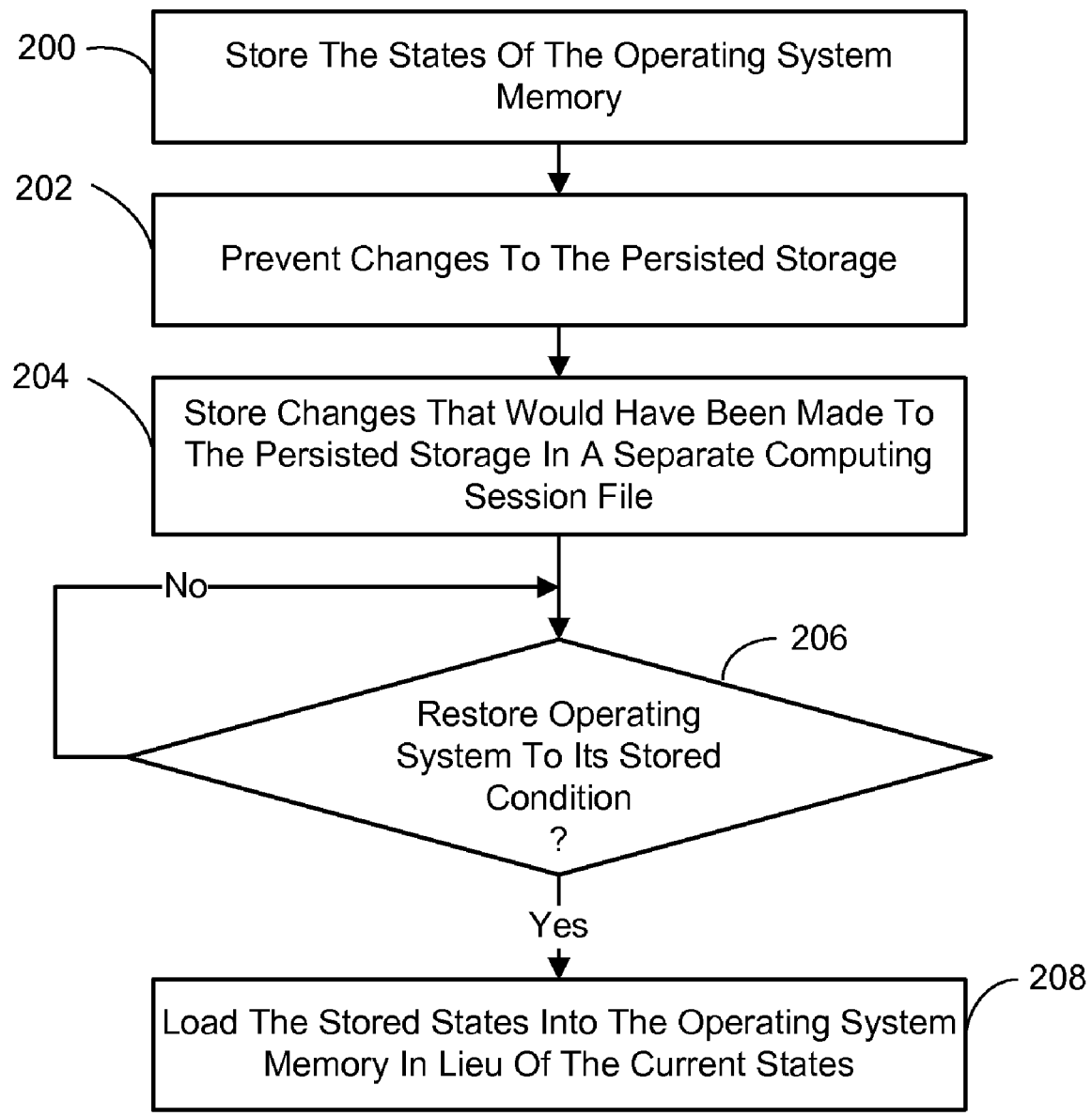
FIG. 2 is a flow diagram generally outlining one embodiment of a process for capturing and loading baseline system states.

The operating system states capture and loading technique embodiments involving the capture of baseline system states can be accomplished in one implementation as depicted in FIG. 2. First, the states of a computer's operating system memory that it is desired to load at a future time, are stored (200). The stored states can be referred to as the baseline system states. In one version, the operating system memory states are stored as a hibernation image file. However, other file types can also be employed as desired.

From this point on no changes are permitted to the persisted storage associated with the computer (202). Instead, changes that would have been made to the persisted storage during an ensuing computing session, had they not been prevented, are stored in a separate computing session file (204). In one version this is accomplished using the aforementioned state management file system filter, which redirects persisted storage changes to the computing session file. Any file type can be used for the computing session file. For example, an appropriated choice would be a virtual hard disk (VHD) file type. The change data stored in the computing session file, in combination with the data stored in the persisted storage, are employed during the computing session in a normal manner, just as if the changes were actually made to the persisted storage.

Leaving the persisted storage associated with the computer untampered with during a computing session allows the baseline system states to be restored by simply loading the stored baseline system states into the system memory. No reconfiguration of the persisted storage is required. In other words, referring to FIG. 2 once again, it is determined if it is desired to return the computer operating system to its condition when the operating system memory states were stored (206). For example, the trigger for this determination could be a user command to restore the operating system to a baseline state, or some other cause for the termination of the current computing session. If it is determined the operating system is not to be restored yet, process action 206 is repeated. However, if it is determined the operating system is to be restored to a previous stored state, then the stored states are loaded into the operating system memory, in lieu of the operating system memory's current states (208).

It is noted that if the sole purpose of capturing the operating system states is to return the operating system to a baseline system state, then the computing session file is simply discarded at the end of the computing session. As will be described in later sections, other embodiments will employ the computing session files. In these embodiments, the session files are retained rather than discarded.

It is further noted that at any time after the baseline system states are captured, they can be replaced with the current system states to generate new baseline states. To accomplish this task, the state management file system filter is temporarily disabled and the changes that were captured in the computing session file are implemented in the persistent storage associated with the computer. This brings the persisted storage in synch with the current operating system memory states. The new baseline system states can then be captured as described previously, with the new operating system memory states being stored in place of the previously stored states.

2.2 Capturing and Loading Computing Session States

As described previously, a user's computing session states can be captured as well. This allows a user to load the captured computing session system states at a future time and continue where he or she left off in the previous computing session. The baseline state is still captured as described above, but in addition, a separate computing session system state is captured.

Figure 3:
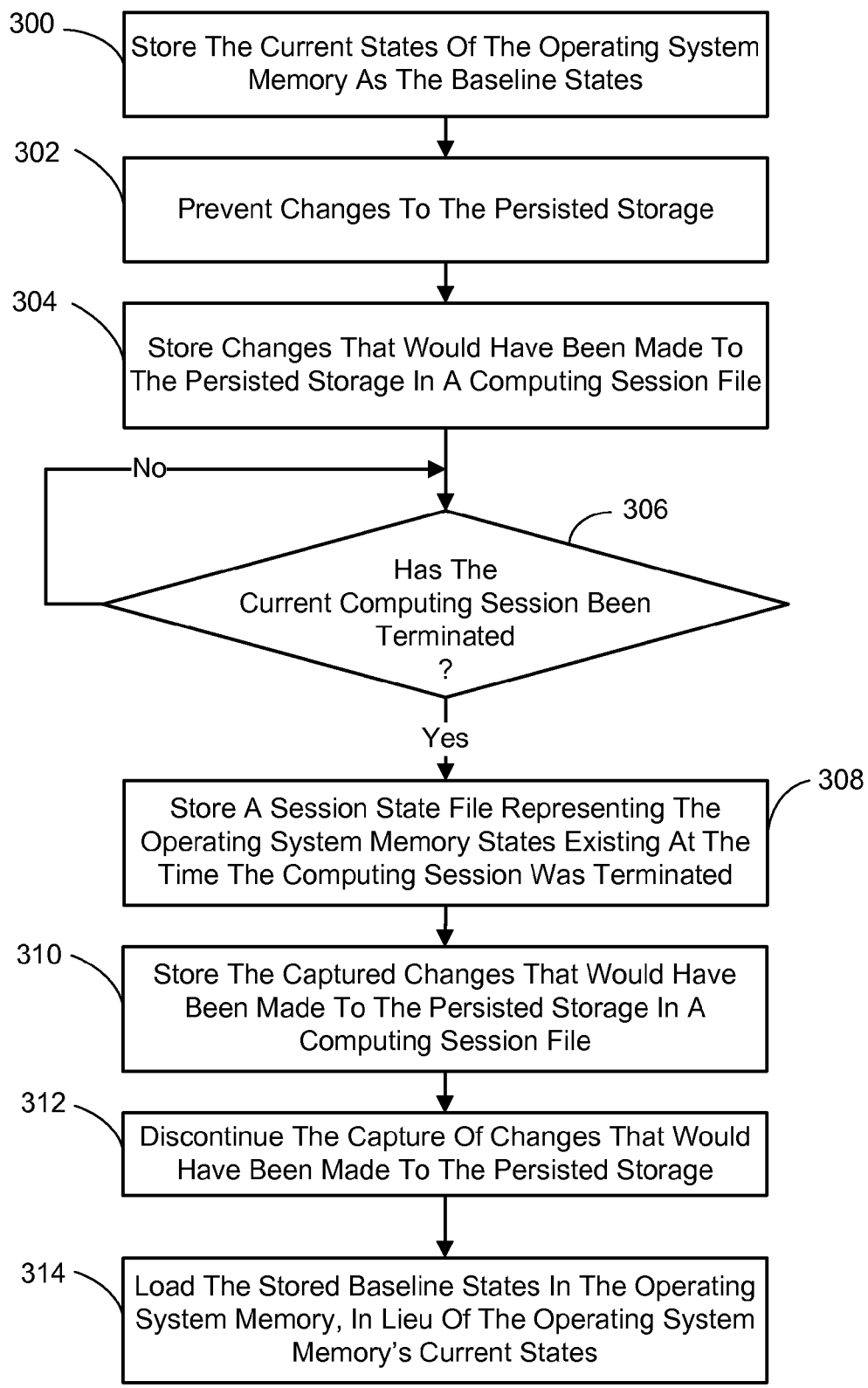
FIG. 3 is a flow diagram generally outlining one embodiment of a process for capturing computing session system states.

In one implementation, the foregoing is accomplished as illustrated in FIG. 3. First, the computer's operating system memory states as they exist at a time specified by the computer user, are stored and designated as the baseline states (300). The persisted storage of the computer is then protected so that changes normally occurring during a computing session are prevented (302). Thus, as described previously, the computer's persistent storage stays in the same condition as when the operating system's baseline memory states were captured. Instead, changes that would have been made to the persisted storage during an ensuing computing session, had they not been prevented, are stored in the previously described computing session file (304). The change data stored in the computing session file, in combination with the data stored in the persisted storage, are employed during the computing session in a normal manner, as described previously.

It is next determined if the current computing session has been terminated (306). If it is determined the session has not been terminated yet, process action 306 is repeated. However, if it is determined the computing session has been terminated, several actions take place. First, a session state file representing the states of the operating system memory of the computer existing at the time the computing session was terminated is stored (308). As with the baseline states file, in one version, the file is stored as a hibernation image file. However, other file types can also be employed as desired. In addition, the captured changes that would have been made to the persisted storage are stored in a computing session file (310). Here again, any file type can be used for the computing session file, such as VHD file. It is noted that the session state file and computing session file are associated with indicators identifying the user and the terminated computing session. The capture of changes that would have been made to the persisted storage during the computing session is also discontinued at this point (312). The computer operating system is then returned to its baseline condition. This entails loading the stored baseline states in the operating system memory, in lieu of the operating system memory's current states (314).

The result of the foregoing procedure is that the computer's operating system is in its baseline condition, and the user's computing session states have been captured in the form of the session state file and computing session file. Given this it will now be described how the user's computing session states are loaded so that the user can continue from where he or she left off in the last session. It is noted that it does not matter if the user loads the stored session as the next-occurring session on the computer, or after several other sessions have been completed. The intervening sessions need not even have been conducted by the user. This is because the computer's operating system is returned to the same baseline condition after each session no matter who the user was, or in what order the sessions occurred.

Figure 4:
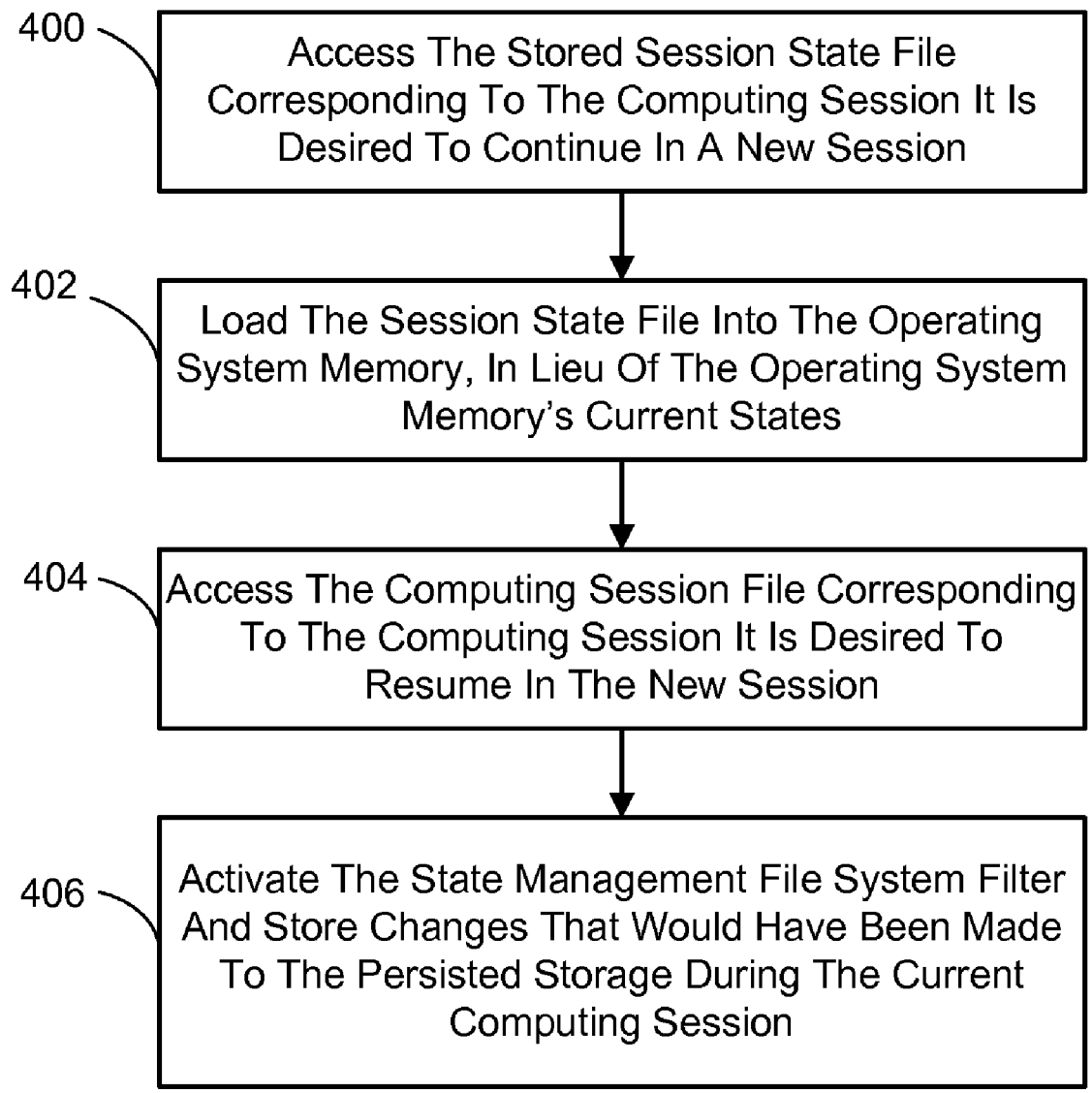
FIG. 4 is a flow diagram generally outlining one embodiment of a process for loading captured computing session states to resume a previous computing session where it left off in a new computing session.

Referring now to FIG. 4, a user's stored computing session states are loaded as follows. First, the stored session state file corresponding to the computing session it is desired to resume in a new session is accessed (400). The accessed session state file is then loaded into the computer's operating system memory, in lieu of the operating system memory's current (i.e., baseline) states (402). In addition, the computing session file corresponding to the computing session it is desired to resume in the new session is accessed (404). Methods of accessing the foregoing files will be described in more detail later in this description. Next, the state management file system filter is activated and changes that would have been made to the persisted storage during the current computing session are captured in the manner described previously (406). The captured changes are stored in the computing session file. As before, the captured changes, as well as other data from the persisted storage, are used during the current computing session.

The actions described in connection with FIG. 3 pertaining to storing the session state file and computing session file associated with a computing session upon its termination, and returning the computer's operating system to its baseline condition, would be implemented once again when the current session is terminated. In this way, the user can chose to resume the just terminated session in a future session. It is noted that the computing sessions file is stored under a new name so that it can be distinguished from the previous session files. This new computing session file represents the last, previously saved session file updated by the addition of the changes captured during the just-terminated computing session. Further, since session state files are saved at the end of each computing session, the user could select from multiple saved sessions that are accessible by the computer. To this end, in one implementation, the aforementioned accessing of a session state file and computing session file, includes providing a list of accessible session state files and corresponding computing session files to a user who is beginning a computing session. The session state file and computing session file associated with a previous computing session that is selected by the user form the list is then accessed and input. Since the session state files and computing session files are also associated with a particular user, the user can be identified first via conventional methods, and then only those files associated with that user would be provided in the list.

In the foregoing implementation, the computer stores the session state files and computing session files in a memory accessible to the computer, such as its hard drive. However, in an alternate implementation, the computer does not retain copies of these files. For instance, in the example of an Internet cafe or other shared access hosts, it may not be desirable to store a customer's session state files and computing session files on a shared computer. In the alternate implementation, at the end of a computing session, the stored session state file and computing session file for that session are made available to the user for download. The user then has the option of storing these files in a portable memory device (e.g., a flash drive, and the like), or possibly transmitting the files via a network connection to another computer (e.g., via an email attachment, and so on). Regardless of whether the user downloads the files or not, they are made inaccessible to the computer.

In implementations where the session state files and computing session files are not retained by the computer, the files need to be provided in order for a user to resume a previous computing session. To this end, accessing these files entails the computer requesting the user input the session state file and computing session file corresponding to the computing session the user wishes to resume. The user would then input the requested files via an appropriate method, depending on how they were stored.

It is further noted that in implementations where the session state files and computing session files are not retained by the computer, a question arises as to whether the files are still compatible with the computer at the time a user wishes to resume a previous computing session. For example, if the computer's baseline system states have been changed since the session state file and computing session file being inputted were captured, they may no longer be compatible. One way to ensure compatibility is to associate the baseline system states file with a version indicator that changes with each new baseline condition. Thus, each baseline is uniquely identified. The session state file and computing session file corresponding to a terminated computing session are then associated with validation information at the time they are stored. The validating information includes the aforementioned baseline version indicator corresponding to the version of the baseline system states from which the files were derived. This indicator would be compared to the baseline version indicator of the baseline system states currently being used by the computer. If they match, the inputted files are compatible (since the computer would have been restored to its baseline condition at the end of the last computing session). If they do not match, the user would be informed that the computing session associated with the inputted files cannot be resumed.

Another reason that the session state file and computing session file input to a computer by a user may not be compatible is that the computer is not the same computer that was used to generate the files. Typically different computers would have different baseline system states. However, it is possible to configure more than one computer to be compatible with the same session state file and computing session file set. This can be accomplished in one implementation by creating common baseline system states with the same the baseline version indicator between all the computers involved. In this way, a session state file and computing session file set generated on one computer would be compatible with another computer since the baseline system states from which the files were derived are the same on both computers.

In a version-controlled baseline system states scheme as described above, an opportunity exists to reduce the size of the session state file. To this end, in one implementation, the differences between the operating system memory baseline states and the states of the operating system memory existing at the time a computing session is terminated are identified. These differences are then stored as the session state file instead of the current states of the entire operating system memory. This variation of the session state file can be referred to as the session states difference file. Because the difference file is missing some of the states that are needed to populate the operating system memory, it is integrated into the baseline operating system memory states file to reconstitute the full computing session states configuration before being loaded into the operating system memory to resume a previous computing session. To this end, a restored session state file is generated from an input session states difference file. This can be done after successfully validating the compatibility of the input files in implementations where validity is checked. The restored session state file is generated by applying the differences in the sessions states difference file to the operating system memory baseline states. In other words those states found in the difference file are used to replace the corresponding states in the baseline states file to produce the restored session state file. Once the session state file is restored it is loaded as described previously to resume the associated computing session.

2.3 Capturing and Incrementally Loading Computing Session States for Debugging Purposes As stated previously, the operating system states capture and loading technique embodiments described herein also allow for rapid debugging through the use of an incremental loading of session states. In general, by injecting incremental portions of the operating system memory states into a known good baseline condition, an application or operating system can be debugged. A user can choose to debug an application or the system, or the debugging process could be initiated by a system crash due to error. In this later scenario, a crash dump file generated at the time of a crash, would be used as the session state file. Conventional debugging techniques are employed with each iteration of this embodiment.

Figure 5A:
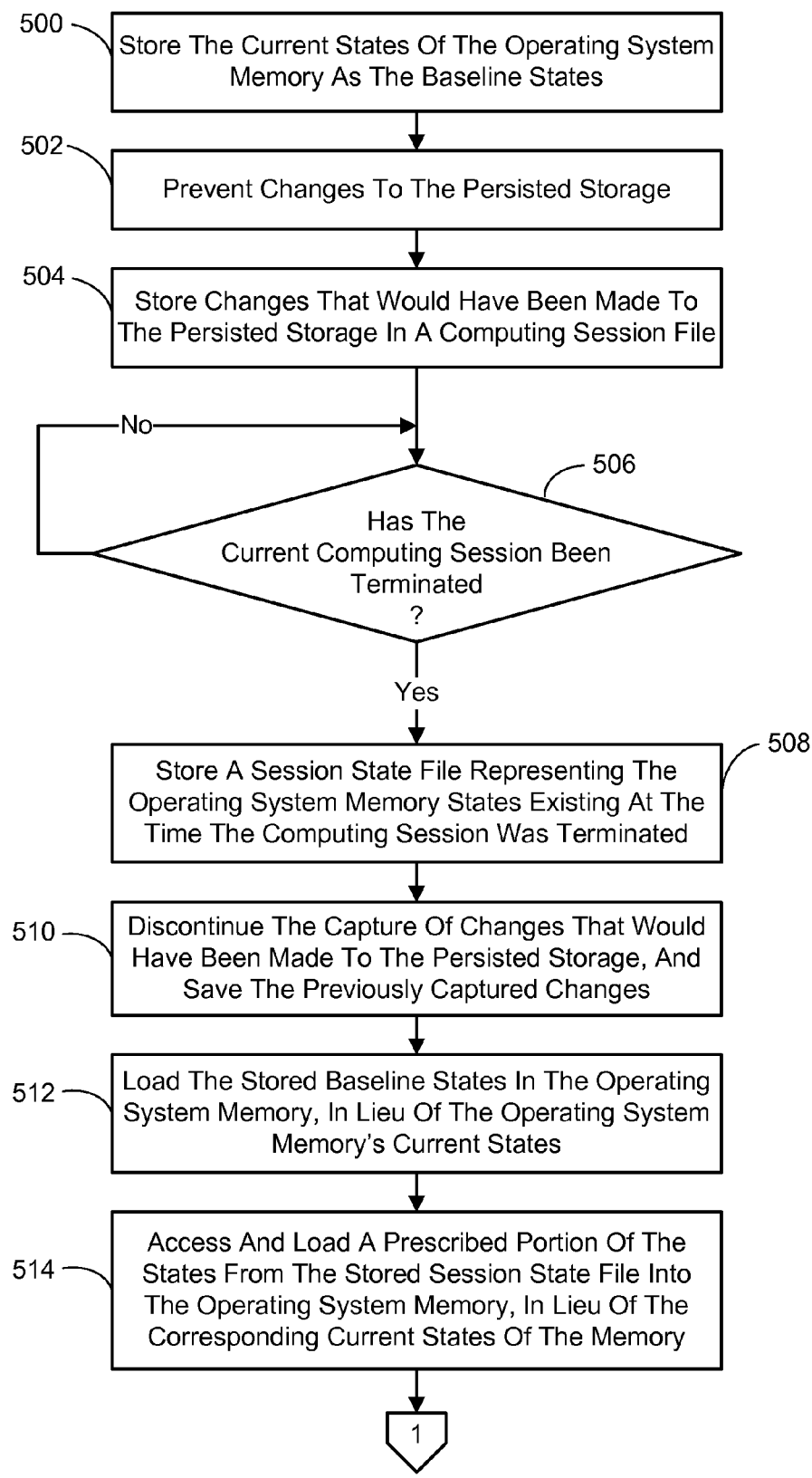
FIGS. 5A-B depict a flow diagram generally outlining one embodiment of a process for incrementally loading computing session states for debugging purposes.
Figure 5B:
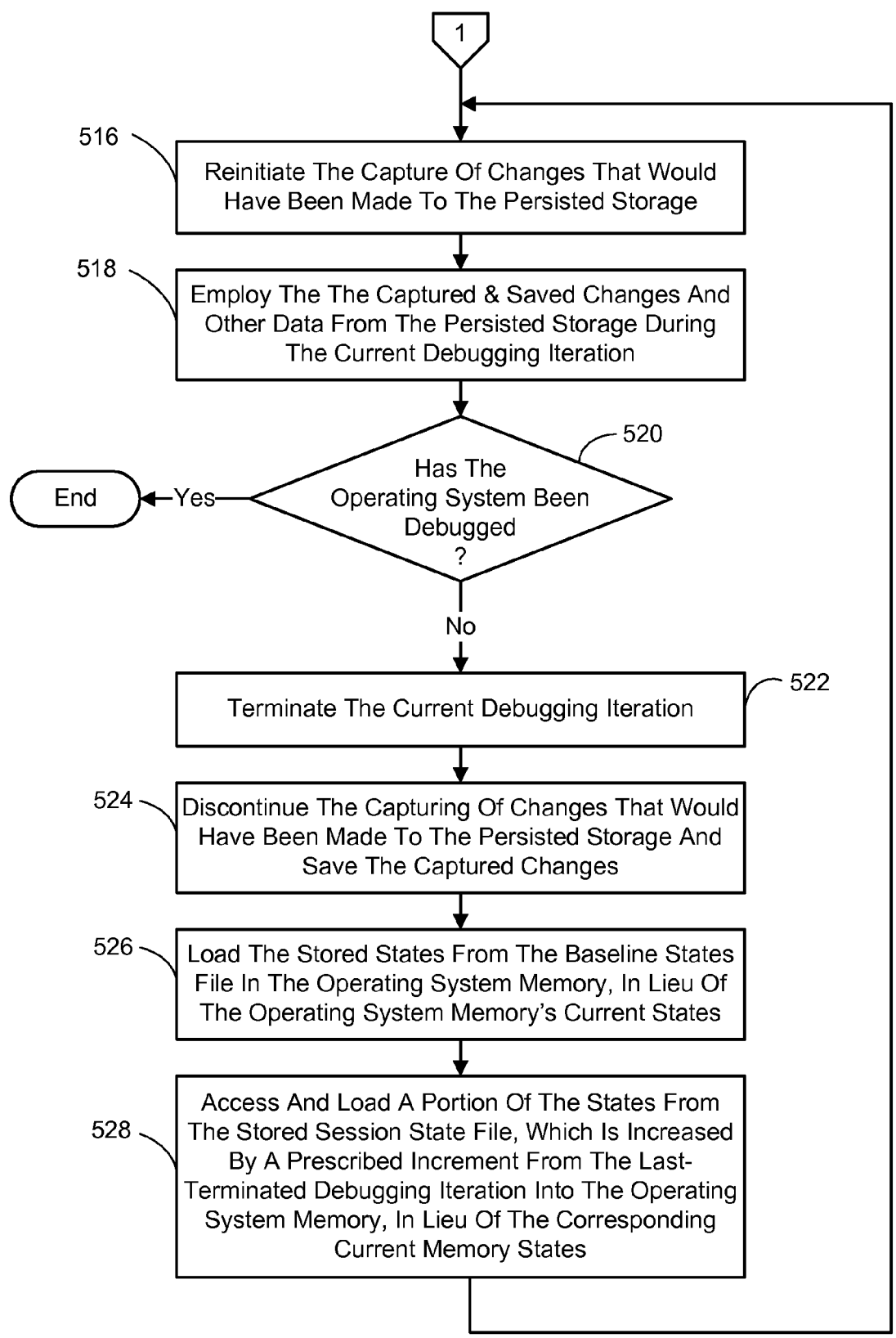

In one implementation, the incremental debugging scheme is achieved as follows. Referring to FIGS. 5A-B, the process begins by establishing a known good baseline condition. To this end, states of the operating system memory of the computer are stored as they exist at a time specified by a user of the computer (500). These states are stored in a baseline states file. As in other implementations, changes are prevented to the persisted storage associated with the computer during the computing session (502), and instead the changes that would have been made to the persisted storage are captured (504). As before, the captured changes as well as other data from the persisted storage, are used during the computing session.

It is next determined if the current computing session has been terminated (506), such as when the user terminates the session to initiate debugging or the system crashes. If it is determined the session has not been terminated yet, process action 506 is repeated. However, when the computing session is terminated, a session state file representing the states of the operating system memory of the computer existing at the time the computing session is terminated is stored (508). In the system crash scenario, this session state file would be the crash dump file. Additionally, the capturing of changes that would have been made to the persisted storage is discontinued, and the changes saved (510). The computer operating system is then returned to its condition when the operating system memory baseline states were stored by loading the stored baseline states in the operating system memory, in lieu of the operating system memory's current states (512).

Once the baseline condition is restored, the incremental debugging process can begin. This entails first accessing and loading a prescribed portion of the states from the stored session state file into the computer's operating system memory, in lieu of the corresponding current states of the computer's operating system memory (514). The capturing of changes that would have been made to the persisted storage is then reinitiated (516). These captured changes, as well as other data from the persisted storage and the previously saved changes, are then employed during a current debugging iteration to debug the computer operating system or a particular application (518). At the end of the debugging procedure, it is determined if the computer's operating system has been debugged (520). If so, the process ends. However, when it is determined that the computer's operating system has not been debugged, the current debugging iteration is terminated (522). The capturing of changes that would have been made to the persisted storage during the current debugging iteration is discontinued and the captured changes saved (524). The computer operating system is again returned to its baseline condition by loading the stored states from the baseline states file in the operating system memory, in lieu of the operating system memory's current states (526). Next, a portion of the states from the stored session state file, which is increased by a prescribed increment from the last-terminated debugging iteration is accessing and loading into the computer's operating system memory, in lieu of the corresponding current states of the computer's operating system memory (528). Process actions (516) through (528) are then repeated as appropriate until the computer's operating system has been debugged.

3.0 The Computing Environment

A brief, general description of a suitable computing environment in which portions of the operating system states capture and loading technique embodiments described herein may be implemented will now be described. As stated previously, the technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 6:
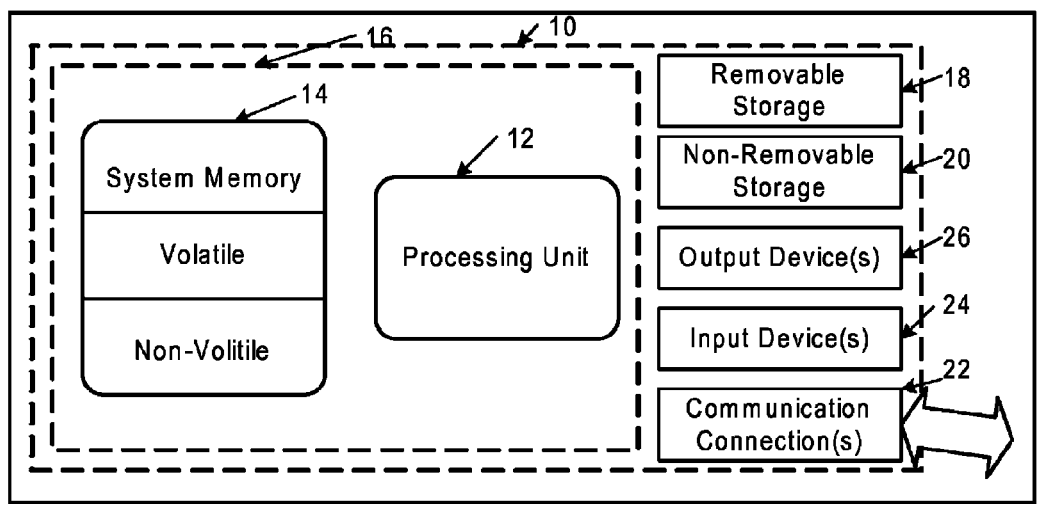
FIG. 6 is a diagram depicting a computing device constituting an exemplary system for implementing operating system states capture and loading technique embodiments described herein.

FIG. 6 illustrates an example of a suitable computing system environment. The computing system environment is only one example of a suitable computing environment and is not intended to suggest any limitation as to the scope of use or functionality of the operating system states capture and loading technique embodiments described herein. Neither should the computing environment be interpreted as having any dependency or requirement relating to any one or combination of components illustrated in the exemplary operating environment. With reference to FIG. 6, an exemplary system for implementing the embodiments described herein includes a computing device, such as computing device 10. In its most basic configuration, computing device 10 typically includes at least one processing unit 12 and memory 14. Memory 14 is a combination of volatile (such as RAM) and non-volatile (such as ROM, flash memory, etc.) storage. This most basic configuration is illustrated in FIG. 6 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 6 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The operating system states capture and loading technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for capturing and loading operating system states, comprising:
    using a computer to perform the following process actions:
    storing states of an operating system memory of the computer that it is desired to load at a future time;
    preventing changes to a persisted storage associated with the computer during a computing session;
    storing changes that would have been made to the persisted storage during the computing session, had they not been prevented, in a separate session file, and employing data stored in the sessions file and in the persisted storage, during the computing session;
    discarding the session file at the end of the computing session; and
    whenever it is desired to return the computer operating system to its condition when the operating system memory states were stored, loading the stored states in the operating system memory, in lieu of the operating system memory's current states.

2. The process of claim 1, wherein the process action of storing changes in a separate session file, comprises an action of storing the changes in a Virtual Hard Disk (VHD) file format.

3. The process of claim 1, wherein the process action of storing states of the operating system memory, comprises an action of storing the states as a hibernation image file.

4. A computer-implemented process for capturing and loading operating system states, comprising:
    using a computer to perform the following process actions:
    storing states of an operating system memory of the computer as they exist at a time specified by a user of the computer, said states being designated as the baseline states of the operating system memory;
    preventing changes to a persisted storage associated with the computer during a computing session;
    capturing changes that would have been made to the persisted storage during the computing session, had they not been prevented, and employing the captured changes as well as other data from the persisted storage, during the computing session; and
    whenever the computing session is terminated,
        storing a session state file representing the states of the operating system memory of the computer existing at the time the computing session is terminated and associating the session state file with the user and the computing session being terminated,
        storing the captured changes in a separate computing session file and associating the computing session file with the user and the computing session being terminated,
        discontinuing the capture of changes that would have been made to the persisted storage during the computing session, and
        returning the computer operating system to its condition when the operating system memory baseline states were stored, said returning comprising loading the stored baseline states in the operating system memory, in lieu of the operating system memory's current states.

5. The process of claim 4, wherein the process action of storing changes in a separate session file, comprises an action of storing the changes in a Virtual Hard Disk (VHD) file format.

6. The process of claim 4, wherein the process action of storing states of the operating system memory, comprises an action of storing the states as a hibernation image file.

7. The process of claim 4, further comprising process actions of:
    whenever it is desired to return the computer to its condition when said computing session was terminated and begin a current computing session,
        accessing and loading the stored session state file corresponding to a computing session into the computer's operating system memory, in lieu of the operating system memory's current states,
        accessing the computing session file corresponding to the computing session,
        reinitiating the capture of changes that would have been made to the persisted storage during the computing session and storing the captured changes in the computing session file, and
        employing the captured changes as well as other data from the persisted storage, during the current computing session.

8. The process of claim 7, further comprising process actions of:
    whenever the current computing session is terminated,
        storing a session state file representing the states of the operating system memory of the computer existing at the time the current computing session is terminated and associating the session state file with the user and the current computing session being terminated,
    generating and storing a new computing session file which updates the last, previously stored session file by the addition of the prevented persisted storage changes captured during the current computing session and associating the new computing session file with the user and the current computing session being terminated,
        discontinuing the capture of changes that would have been made to the persisted storage during the current computing session, and
        returning the computer operating system to its condition when the operating system memory baseline states were stored, said returning comprising loading the stored baseline states in the operating system memory, in lieu of the operating system memory's current states.

9. The process of claim 8, wherein session state files and computing session files associated with multiple computing sessions are accessible by the computer, and wherein the process actions of accessing and loading the stored session state file corresponding to a computing session into the computer's operating system memory, in lieu of the operating system memory's current states, and accessing the computing session file corresponding to the computing session, comprises actions of:
   providing a list of accessible session state files and computing session files to a user who is beginning a current computing session;
   inputting a user-selection of the session state file and computing session file from the provided list which corresponds to a previous computing session the user wishes to re-open as the current session; and
   using the user-selected session state file and computing session file to return the computer to its condition when the previous computing session was terminated and begin a current computing session.

10. The process of claim 9, wherein the process actions of storing session state files and computing session files comprises an action of storing the files in a non-volatile memory accessible to the computer.

11. The process of claim 8, wherein the process action of returning the computer operating system to its condition when the operating system memory baseline states were stored, further comprises the actions of:
   making the stored session state file and computing session file corresponding to the last-terminated computing session available to the user for download; and
   deleting the stored session state file and computing session file corresponding to the last-terminated computing session from memories accessible to the computer.

12. The process of claim 11, wherein the process actions of accessing a session state file and computing session file, comprises the actions of:
   requesting the user input the session state file and computing session file; and
   inputting the session state file and computing session file when received from the user.

13. The process of claim 12, wherein the process actions of storing a session state file and storing a computing session file comprise an action of associating the files with validation information which comprises a baseline version indicator identifying the version of the operating system memory baseline states from which the files were derived.

14. The process of claim 13, wherein the process actions of accessing a session state file and computing session file, further comprise the actions of:
   determining if the a session state file and computing session file were derived from the operating system memory baseline states of the operating system employed by the computer based on the validation information associated with the files;
   accessing a session state file and computing session file, whenever it is determined the session state file and computing session file were derived from the operating system memory baseline states of the operating system employed by the computer; and
   informing the user that the session state file and computing session file cannot be accessed, whenever it is determined the session state file and computing session file were not derived from the operating system memory baseline states of the operating system employed by the computer.

15. The process of claim 8, wherein the process action of storing a session state file, comprises the actions of:
   identifying the differences between the operating system memory baseline states and the states of the operating system memory existing at the time the last-conducted computing session is terminated; and
   storing the identified differences as a session states difference file.

16. The process of claim 15, wherein the process action of accessing the stored session state file corresponding to the computing session, comprises an actions of:
   generating and storing a restored session state file by applying the differences in the sessions states difference file to the operating system memory baseline states; and
   designating the restored session state file as the stored session state file to be accessed.

17. A computer-implemented process for capturing and loading operating system states, comprising:
   using a computer to perform the following process actions:
   (a) storing states of an operating system memory of the computer as they exist at a time specified by a user of the computer, said states being stored in a baseline states file;
   (b) preventing changes to a persisted storage associated with the computer during a computing session;
   (c) capturing changes that would have been made to the persisted storage during the computing session had they not been prevented;
   (d) employing the captured changes as well as other data from the persisted storage, during the current computing session,
   (e) whenever the computing session is terminated,
      storing a session state file representing the states of the operating system memory of the computer existing at the time the computing session is terminated,
      discontinuing the capture of changes that would have been made to the persisted storage during the current computing session and saving the captured changes, and
      returning the computer operating system to its condition when the operating system memory baseline states were stored, said returning comprising loading the stored baseline states in the operating system memory, in lieu of the operating system memory's current states;
   (f) accessing and loading a prescribed portion of the states from the stored session state file into the computer's operating system memory, in lieu of the corresponding current states of the computer's operating system memory;
   (g) reinitiating the capture of changes that would have been made to the persisted storage;
   (h) employing the captured changes as well as other data from the persisted storage and the saved changes, during a current debugging iteration to debug the computer operating system;
   (i) determining if the computer's operating system has been debugged;
   (j) whenever it is determined the computer's operating system has not been debugged,
      terminating the current debugging iteration,
      discontinuing the capture of changes that would have been made to the persisted storage during the current debugging iteration and saving the captured changes,
      returning the computer operating system to its condition when the operating system memory baseline states were stored, said returning comprising loading the stored states from the baseline states file in the operating system memory, in lieu of the operating system memory's current states,
      accessing and loading a increased portion of the states from the stored session state file corresponding to the last-terminated debugging iteration into the computer's operating system memory, in lieu of the corresponding current states of the computer's operating system memory, wherein the increased portion of the states from the stored session state file comprises the states from the stored session state file loaded in the last-terminated debugging iteration plus a prescribed additional portion of the states from the stored session state file, and (k) repeating actions (g) through (j) until the computer's operating system has been debugged.

18. The process of claim 17, wherein the computing session is automatically terminated by the computer's operating system due to an error, and wherein the session state file is a crash dump file.

19. The process of claim 17, wherein the computing session is terminated by the user for the purpose of debugging the computer's operating system.

* * * * *